US007536415B2

(12) United States Patent
Miyahara

(10) Patent No.: US 7,536,415 B2
(45) Date of Patent: May 19, 2009

(54) INFORMATION PROVIDING METHOD, INFORMATION PROVIDING SYSTEM, INFORMATION PROVIDING APPARATUS, AND INFORMATION OBTAINING APPARATUS

(75) Inventor: Shunji Miyahara, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 818 days.

(21) Appl. No.: 10/525,762

(22) PCT Filed: Aug. 25, 2003

(86) PCT No.: PCT/JP03/10683

§ 371 (c)(1),
(2), (4) Date: Mar. 18, 2005

(87) PCT Pub. No.: WO2004/019226

PCT Pub. Date: Mar. 4, 2004

(65) Prior Publication Data

US 2005/0249351 A1 Nov. 10, 2005

(30) Foreign Application Priority Data

Aug. 26, 2002 (JP) ............................ 2002-244761

(51) Int. Cl.
*G06F 7/00* (2006.01)
*G06F 17/00* (2006.01)
*G06F 19/00* (2006.01)

(52) U.S. Cl. ...................... 707/104.1; 707/10; 705/500; 700/115

(58) Field of Classification Search ................... 707/10, 707/104.1; 705/500; 700/115
See application file for complete search history.

(56) References Cited

U.S. PATENT DOCUMENTS 5,253,341 A * 10/1993 Rozmanith et al. .......... 709/247

(Continued)

FOREIGN PATENT DOCUMENTS

JP A-2001-134793 5/2001

(Continued)

OTHER PUBLICATIONS

Brewer et al., "Intelligent Tracking in Manufacturing", Journal of Intelligent Manufacturing vol. 10, pp. 245-250, Kluwer Academic Publishers, 1999.*

(Continued)

*Primary Examiner*—Christian P. Chace
*Assistant Examiner*—Michael J Hicks
(74) *Attorney, Agent, or Firm*—Oliff & Berridge, PLC

(57) ABSTRACT

A computer unit 71 disposed at a vehicle assembly plant 70 sends to an information providing center 40 chassis number information and MAC address information and phone number information of a communication unit 15 of a vehicle. A computer unit 81 at a vehicle sales shop 80 transmits to the center 40 chassis number information and information representing the number plate of the vehicle. The center 40 registers the sent information pieces as movable-body-specifying information and user-specifying information, respectively. By use of an apparatus 10, a user requests the center 40 to provide information. The center 40 authenticates the movable-body-specifying information and the user-specifying information sent from the apparatus 10, checks whether or not the present location of the vehicle coincides with a predetermined location, and specifies the user. Then, the center 40 provides information to the specified user.

15 Claims, 5 Drawing Sheets

U.S. PATENT DOCUMENTS

| | | | |
|---|---|---|---|
| 6,943,126 | B1 | 9/2005 | Narayanan et al. |
| 2002/0064969 | A1 | 5/2002 | Havemann |

FOREIGN PATENT DOCUMENTS

| | | |
|---|---|---|
| JP | A-2002-073608 | 3/2002 |
| JP | A-2002-074585 | 3/2002 |
| JP | A-2002-176551 | 6/2002 |
| JP | A-2002-182768 | 6/2002 |
| WO | WO 02/28125 A2 | 4/2002 |

OTHER PUBLICATIONS

Daisuke Tanaka; "Internet Jidosha Kaihatsu ga Saishu Kyokumen Hanyo DSRC de Tami Shudo e Kiri kawaru ITS"; *Telecommunication*; Kabushiki Kaisha Ric Telecom; vol. 18, No. 12: pp. 48-53; Nov. 25, 2001.

Toshihiko Muranaka; "Jidosha Muke Joho Service ni Fukyu no Kizashi Ugokidasu 'Telematics'"; *Nikkei Computer*; Nikkei Business Publications, Inc.; vol. 544: pp. 44-54; Mar. 25, 2002.

* cited by examiner

INFORMATION PROVIDING METHOD, INFORMATION PROVIDING SYSTEM, INFORMATION PROVIDING APPARATUS, AND INFORMATION OBTAINING APPARATUS

TECHNICAL FIELD

The present invention relates to an information providing method in which movable bodies and a fixed station communicate with each other and the fixed station provides various types of information to an authenticated movable body, as well as to an information providing apparatus and an information obtaining apparatus used in the method.

BACKGROUND ART

Conventionally, there have been known an information providing method which enables a fixed station to provide various types of information to a specific movable body, as well as an apparatus used in the method. For example, Japanese Patent Application Laid-Open (kokai) No. 2002-176551 discloses such an information providing method and apparatus. In the disclosed information providing method, a contents data supply apparatus obtains, from a user who requests provision of information, an ID of an output unit (e.g., printer) owned by the user. The contents data supply apparatus distributes contents data while specifying an output apparatus that can output contents data, by means of embedding, in the contents data, electronic watermark information containing the obtained ID. The user can obtain various types of information represented by the contents data by receiving the contents data by making use of a terminal apparatus to which the output unit is connected. This method enables identification of the user who uses the contents data distributed from the contents data supply apparatus and effectively protects the copyright of the provided contents data.

However, in the conventional information providing method and apparatus therefor, since a user for whom information is provided is specified by use of an ID for identifying an output unit, only a terminal apparatus to which the output unit is connected can receive the contents data. Therefore, when the user changes his terminal apparatus to which the output terminal is connected, he or she must input the ID of the output unit into a new terminal apparatus. Incidentally, work for investigating the ID of the output unit is very cumbersome, and therefore, in some cases replacement of the terminal apparatus is difficult.

DISCLOSURE OF THE INVENTION

The present invention has been accomplished so as to cope with the above-described problem, and its object is to provide an information providing method which does not require special operation by the user, and enables a fixed station to reliably specify a user for provision of information, as well as an apparatus used in the method.

The present invention provides an information providing method in which a movable body and a fixed station communicate with each other and the fixed station provides various types of information to the movable body, the method being characterized in that the movable body previously registers, in the fixed station, movable-body identification information for identifying the movable body, communication unit identification information for identifying a communication unit which is assembled in the movable body and used for communication with the fixed station, and user identification information for identifying a user who owns the movable body in a mutually related manner; and when request information representing request for information provision and at least one of movable-body identification information, communication unit identification information, and user identification information are sent from the movable body, the fixed station authenticates the movable body by comparing at least one of the movable-body identification information, the communication unit identification information, and the user identification information sent from the movable body with the movable-body identification information, the communication unit identification information, and the user identification information registered in a mutually related manner, and provides a predetermined piece of information to the movable body on the basis of the request information when the movable body is specified by the authentication.

In this case, preferably, a first information registration apparatus capable of communicating with the fixed station is disposed at a predetermined first location, and a second information registration apparatus capable of communicating with the fixed station is disposed at a predetermined second location; and as the movable-body identification information, the communication unit identification information, and the user identification information to be registered in the fixed station in a mutually related manner, the first information registration apparatus registers movable-body identification information issued at the time of manufacture of the movable body and communication unit identification information issued at the time of manufacture of the communication unit in the fixed station in a mutually related manner, and the second information registration apparatus registers user identification information in the fixed station while relating the user identification information with at least one of the movable-body identification information and the communication unit identification information registered in the fixed station in a mutually related manner.

Preferably, when request information representing request for information provision, present location information representing a present location of the movable body, and at least one of movable-body identification information, communication unit identification information, and user identification information are sent from the movable body, the fixed station authenticates the movable body by comparing at least one of the movable-body identification information, the communication unit identification information, and the user identification information sent from the movable body with the movable-body identification information, the communication unit identification information, and the user identification information registered in a mutually related manner, determines whether the movable body is present at the predetermined location on the basis of the present location information sent from the movable body, and provides a predetermined piece of information to the movable body on the basis of the request information when the movable body is specified by the authentication and the movable body is determined to be present at the predetermined location.

In these cases, the communication unit is preferably installed in the movable body in an integrated manner. Further, at least one the movable-body identification information and the communication unit identification information is preferably represented by a barcode.

In the above-described method, the movable body is preferably a vehicle. In this case, preferably, the predetermined first location is a plant at which the vehicle is manufactured, and the predetermined second location is a sales shop at which the vehicle is sold. Preferably, the movable-body identification information is chassis number information representing a unique chassis number which is issued at the time of manufacture of the vehicle, and the communication unit identification information is composed of unique identification information which is issued by a predetermined organization at the time of manufacture of the communication unit and information representing a phone number previously allotted to the communication unit. Preferably, the user identification information is composed of vehicle registration number information representing a vehicle registration number which is issued by a predetermined organization at the time of sales of the vehicle, and user ID information and user password information which are issued from the fixed station and used for accessing the fixed station.

According to another aspect, the present invention provides an information providing system in which a movable body and a fixed station communicate with each other and the fixed station provides various types of information to the movable body, the system being characterized in that the movable body comprises: means for inputting movable-body identification information for identifying the movable body, communication unit identification information for identifying a communication unit which is assembled in the movable body and used for communication with the fixed station, and user identification information for identifying a user who owns the movable body, and sending means for sending to the fixed station the movable-body identification information, the communication unit identification information, and the user identification information entered by the input means; and the fixed station comprises: first receiving means for receiving the movable-body identification information, the communication unit identification information, and the user identification information sent from the movable body, registering means for registering, in a mutually related manner, the movable-body identification information, the communication unit identification information, and the user identification information received by the first receiving means, storage means for storing the movable-body identification information, the communication unit identification information, and the user identification information registered by the registering means in a mutually related manner, second receiving means for receiving request information representing request for information provision and at least one of movable-body identification information, communication unit identification information, and user identification information sent from the movable body, authentication means for authenticating the movable body by comparing at least one of the movable-body identification information, the communication unit identification information, and the user identification information, received by the second receiving means, with the movable-body identification information, the communication unit identification information, and the user identification information registered in the storage means in a mutually related manner, and sending means for sending a predetermined piece of information to the movable body on the basis of the request information received by the second receiving means.

The present invention also provides an information providing system in which a movable body and a fixed station communicate with each other and the fixed station provides various types of information to the movable body, the system being characterized by comprising: a first information registration apparatus disposed at a predetermined first location and being capable of communicating with the fixed station and a second information registration apparatus disposed at a predetermined second location and being capable of communicating with the fixed station, wherein the first information registration apparatus comprises: input means for inputting movable-body identification information issued at the time of manufacture of the movable body and communication unit identification information issued at the time of manufacture of the communication unit assembled in the movable body and used for communication with the fixed station, and sending means for sending to the fixed station the movable-body identification information and the communication unit identification information input by the input means; the second information registration apparatus comprises: input means for inputting user identification information and at least one of the movable-body identification information and the communication unit identification information, and sending means for sending to the fixed station the user identification information and at least one of the movable-body identification information and the communication unit identification information input by the input means; the movable body comprises: input means for inputting request information for requesting the fixed station to provide various types of information, and sending means for sending, along with the request information input by the input means, at least one of the movable-body identification information, the communication unit identification information, and user identification information; and the fixed station comprises: first receiving means for receiving the movable-body identification information and the communication unit identification information sent from the first information registration apparatus and for receiving the user identification information and at least one of the movable-body identification information and the communication unit identification information sent from the second information registration apparatus, registering means for registering, in a mutually related manner, the movable-body identification information, the communication unit identification information, and the user identification information received by the first receiving means, storage means for storing the movable-body identification information, the communication unit identification information, and the user identification information registered by the registering means in a mutually related manner, second receiving means for receiving the request information representing request for information provision and at least one of movable-body identification information, communication unit identification information, and user identification information sent from the movable body, authentication means for authenticating the movable body by comparing at least one of the movable-body identification information, the communication unit identification information, and the user identification information, received by the second receiving means, with the movable-body identification information, the communication unit identification information, and the user identification information registered in the storage means in a mutually related manner, and sending means for sending a predetermined piece of information to the movable body on the basis of the request information received by the second receiving means.

The present invention also provides an information providing system in which a movable body and a fixed station communicate with each other and the fixed station provides various types of information to the movable body, the system being characterized by comprising: a first information registration apparatus disposed at a predetermined first location and being capable of communicating with the fixed station and a second information registration apparatus disposed at a predetermined second location and being capable of communicating with the fixed station, wherein the first information registration apparatus comprises: input means for inputting movable-body identification information issued at the time of manufacture of the movable body and communication unit identification information issued at the time of manufacture of the communication unit assembled in the movable body and used for communication with the fixed station, and sending means for sending to the fixed station the movable-body identification information and the communication unit identification information input by the input means; the second information registration apparatus comprises: input means for inputting user identification information and at least one of the movable-body identification information and the communication unit identification information, and sending means for sending to the fixed station the user identification information and at least one of the movable-body identification information and the communication unit identification information input by the input means; the movable body comprises: input means for inputting request information for requesting the fixed station to provide various types of information, and sending means for sending the request information input by the input means, present location information representing a present location of the movable body, and at least one of the movable-body identification information, the communication unit identification information, and user identification information; and the fixed station comprises: first receiving means for receiving the movable-body identification information and the communication unit identification information sent from the first information registration apparatus and for receiving the user identification information and at least one of the movable-body identification information and the communication unit identification information sent from the second information registration apparatus, registering means for registering, in a mutually related manner, the movable-body identification information, the communication unit identification information, and the user identification information received by the first receiving means, storage means for storing the movable-body identification information, the communication unit identification information, and the user identification information registered by the registering means in a mutually related manner, second receiving means for receiving the request information representing request for information provision, the present location information representing the present location of the movable body, and at least one of movable-body identification information, communication unit identification information, and user identification information sent from the movable body, authentication means for authenticating the movable body by comparing at least one of the movable-body identification information, the communication unit identification information, and the user identification information, received by the second receiving means, with the movable-body identification information, the communication unit identification information, and the user identification information registered in the storage means in a mutually related manner, determination means for determining whether or not the movable body is present at the predetermined location on the basis of the movable-body present location information received by the second receiving means, and sending means for sending a predetermined piece of information to the movable body on the basis of the request information received by the second receiving means.

According to another aspect, the present invention provides a fixed station which provides various types of information to a movable body, the fixed station comprising: first receiving means for receiving, from the movable body, movable-body identification information and communication unit identification information for specifying the movable body and user identification information for specifying a user of the movable body; movable-body-specifying information registering means for registering, in a mutually related manner, the movable-body identification information and the communication unit identification information received by the first receiving means; movable-body-specifying information registration database for accumulating and storing the information pieces registered by the movable-body-specifying information registering means; user-specifying information registering means for registering the user identification information received by the first receiving means, while relating the user identification information with at least one of the movable-body identification information and the communication unit identification information; user-specifying information registration database for accumulating and storing the information pieces registered by the user-specifying information registering means; contents data base for storing contents information to be provided to the user; second receiving means for receiving request information representing request for the contents information and at least one of movable-body identification information, communication unit identification information, and user identification information sent from the movable body, authentication means for authenticating the movable body by comparing at least one of the movable-body identification information, the communication unit identification information, and the user identification information, received by the second receiving means, with the movable-body identification information and the communication unit identification information stored in the movable-body-specifying information registration database, and the user identification information registered in the user-specifying information registration database; and sending means for sending the contents information stored in the contents database.

The present invention also provides a fixed station which provides various types of information to a movable body, the fixed station comprising: first receiving means for receiving, from the movable body, movable-body identification information and communication unit identification information for specifying the movable body and user identification information for specifying a user of the movable body; movable-body-specifying information registering means for registering, in a mutually related manner, the movable-body identification information and the communication unit identification information received by the first receiving means; movable-body-specifying information registration database for accumulating and storing the information pieces registered by the movable-body-specifying information registering means; user-specifying information registering means for registering the user identification information received by the first receiving means, while relating the user identification information with at least one of the movable-body identification information and the communication unit identification information; user-specifying information registration database for accumulating and storing the information pieces registered by the user-specifying information registering means; contents data base for storing contents information to be provided to the user; second receiving means for receiving request information representing request for the contents information, movable body present location information, and at least one of movable-body identification information, communication unit identification information, and user identification information sent from the movable body, authentication means for authenticating the movable body by comparing at least one of the movable-body identification information, the communication unit identification information, and the user identification information, received by the second receiving means, with the movable-body identification information and the communication unit identification information stored in the movable-body-specifying information registration database, and the user identification information registered in the user-specifying information registration database; determination means for determining whether or not the movable body is present at the predetermined location on the basis of the movable-body present location information received by the second receiving means; and sending means for sending the contents information stored in the contents database.

Further, another feature of the present invention resides in an information obtaining apparatus for obtaining various types of information from a fixed station, the information obtaining apparatus comprising: input means for inputting identification information for receiving authentication at the fixed station and for inputting a request for requesting the fixed station to provide the various types of information; communication means for sending the information pieces input by the input means and for receiving the various types of information from the fixed station; storage means for storing the various types of information received by the communication means; and display means for displaying for the user the various types of information stored in the storage means.

Further, still another feature of the present invention resides in an information obtaining apparatus for obtaining various types of information from a fixed station, the information obtaining apparatus comprising: input means for inputting identification information for receiving authentication at the fixed station and for inputting a request for requesting the fixed station to provide the various types of information; present location detecting means for detecting a present location; communication means for sending the information pieces input by the input means and information representing the present location detected by the present location detecting means, and for receiving the various types of information from the fixed station; storage means for storing the various types of information received by the communication means; and display means for displaying for the user the various types of information stored in the storage means.

According to these features, by means of the first information registration apparatus, movable-body identification information and communication unit identification information of a movable body (e.g., a cellular phone, a personal computer, a PDA, etc.) are registered in the fixed station. Further, by means of the second information registration apparatus, user identification information for specifying a user who owns the movable body is registered in the fixed station. The movable body and the communication unit are unitarily assembled, and the user identification information and at least one of the movable-body identification information and the communication unit identification information are related to each other. Therefore, at the fixed station, the movable-body identification information, the communication unit identification information, and the user identification information can be registered in a linked manner. As described above, the above-mentioned information pieces are registered by the first and second information registration apparatuses, the user is not required to perform the registration procedure, and can considerably easily register information pieces for specifying the user and the movable body in the fixed station. Further, even when the user change the used movable body, since the movable-body identification information, the communication unit identification information, and the user identification information are registered in the above-described manner, the user can easily change the movable body and can easily receive provision of information from the fixed station, without performance of any special operation.

In this case, when the movable body is a vehicle, a chassis number serves as the movable-body identification information, a unique identification number (e.g., MAC (Media Access Control) address) and phone number information of the communication unit serve as the communication unit identification information, and a vehicle registration number (number plate), a user ID, and a user password serve as the user identification information. Further, the predetermined first location is a plant at which the vehicle is fabricated, and the predetermined second location is a sales shop at which the vehicle is sold.

Further, the above-described feature enables the movable body to send the present location information of the movable body to the fixed station, and enables the fixed station to determine whether or not the movable body is present at the predetermined location. By virtue of this, when the movable body is not present at the predetermined location, the movable body cannot receive information from the fixed station. Therefore, in the case where a contract is made between the user and the fixed station such that the user uses the movable body at a predetermined location (e.g., home or office), the user and the movable body can be specified more reliably from the present location information and the movable-body identification information, the communication unit identification information, or the user specifying information. That is, even in the case where a person other than the user pretends to be the user, and requests the fixed station to provide information, at a location other than the predetermined location and by use of another movable body, the person cannot receive provision of information. Accordingly, the fixed station provides information only to authenticated users and movable bodies, and therefore, the copyright in relation to the information to be provided can be properly protected.

BEST MODE FOR CARRYING OUT THE INVENTION

Figure 1:
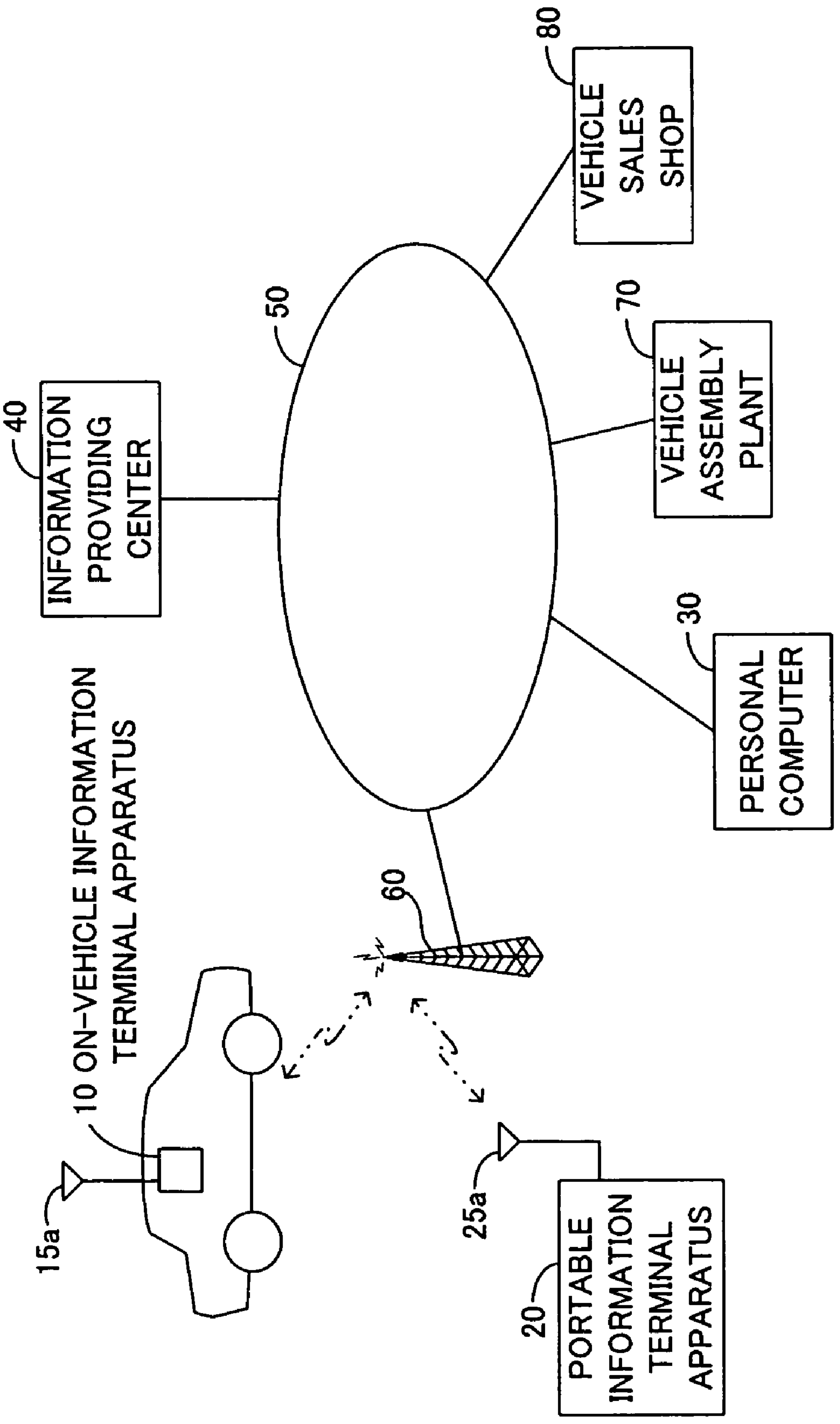
FIG. 1 is a schematic block diagram showing the entirety of an information providing system according to an embodiment of the present invention.

One embodiment of the present invention will now be described with reference to the drawings. FIG. 1 is a schematic block diagram schematically showing an information providing system according to the embodiment.

This information providing system comprises an on-vehicle information terminal apparatus 10 which is mounted on a vehicle, serving as a movable body; a portable information terminal apparatus 20 such as a cellular phone; a personal computer 30 disposed at the home of a user; an information providing center 40 which provides information to movable bodies; a vehicle assembly plant 70 at which vehicles are assembled; and a vehicle sales shop 80 at which vehicles are sold. The on-vehicle information terminal apparatus 10 and the portable information terminal apparatus 20 are constructed so as to be able to communicate, by radio, with a relay station 60, which is connected to a network 50 (e.g. the Internet). The personal computer 30, the information providing center 40, the vehicle assembly plant 70, and the vehicle sales shop 80 are also connected to the network 50.

Figure 2:
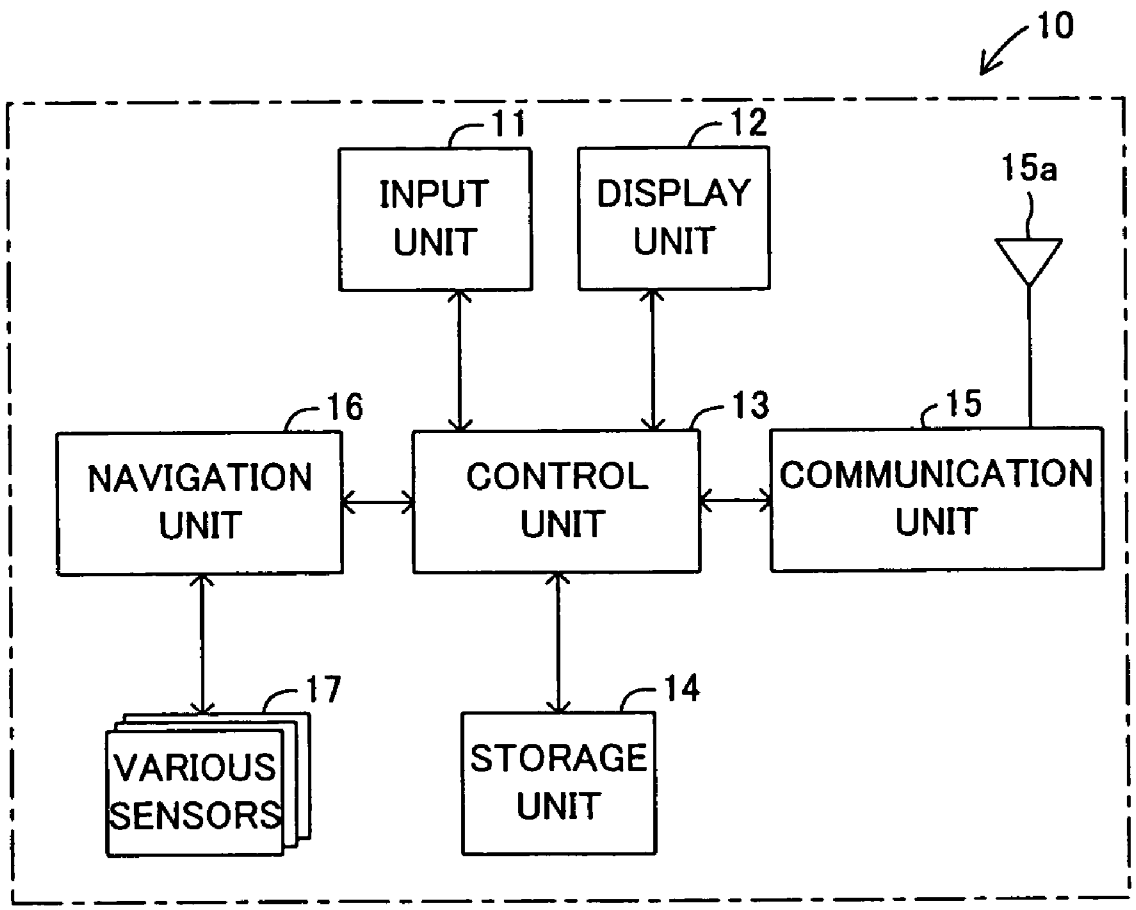
FIG. 2 is a schematic block diagram of an on-vehicle information terminal apparatus of FIG. 1.

The on-vehicle information terminal apparatus 10 is disposed near the driver's seat in the passenger compartment and, as shown in FIG. 2, includes an input unit 11, a display unit 12, a control unit 13, a storage unit 14, a communication unit 15, a navigation unit 16, and various sensors 17, all these elements being interconnected for mutual communications. The input unit 11 is in the form of an operation switch disposed near the display unit 12, or a panel touch switch built in the display unit 12 to detect touch operations on a display panel or the like, thereby inputting instructions of the driver. The display unit 12 is in the form of a liquid crystal display unit or the like, which displays letters, graphics, etc. on a display panel.

The control unit 13 includes a CPU, ROM, RAM, etc. and controls operations of the display unit 12, the storage unit 14, the communication unit 15, and the navigation unit 16 under the driver's instructions, upon execution of a program. The storage unit 14 includes a recording medium such as a hard disk, a CD-ROM, or a DVD-ROM, and a drive unit for the recording medium. Various programs (e.g., a browser program) and various kinds of data are previously stored in the storage unit 14. The communication unit 15 is communicable with the information providing center 40 via the relay station 60. Identification information (hereinafter referred to as a "MAC address") for identifying the communication unit 15 is allotted to the communication unit 15 during manufacture thereof. Further, a phone number used for communications with the information providing center 40 is provided to the communication unit 15 when the unit 15 is assembled in the vehicle. An antenna 15*a* is connected to the communication unit 15 for wireless communication with the relay station 60.

The navigation unit 16 includes a CPU, ROM, RAM, etc. Through execution of a program previously stored in the storage unit 14, the navigation unit 16 grasps the present location of the vehicle on the basis of detection values output from the various sensors 17, and guides the driver by providing a route to a destination. The various sensors 17, which are connected to the navigation unit 16, include sensors which mainly detect the present location of the vehicle; i.e., a terrestrial magnetism sensor, a gyro, and a GPS (Global Positioning System) receiver; a vehicle speed sensor; and a wheel revolution number sensor. The on-vehicle information terminal apparatus 10 configured as described above realizes various functions, such as a function of receiving content information provided from the information providing center 40 and a function of transmitting information representing the present location of the vehicle to the information providing center 40, through execution of the above-mentioned various programs.

The portable information terminal apparatus 20 has a configuration similar to that of the above-described on-vehicle information terminal apparatus 10, and includes an input unit, a display unit, a control unit, a storage unit, and a communication unit, which are interconnected for mutual communications. The portable information terminal apparatus 20 is configured to be compact to thereby enable a user to carry the apparatus. An antenna 25*a* is provided on the communication unit of the portable information terminal apparatus 20 so as to enable wireless communication with the relay station 60. The portable information terminal apparatus 20 having the above-described configuration may be the above-described cellular phone, or a portable personal computer or personal digital assistant (PDA) which has a communication function.

The personal computer 30 has a configuration similar to that of the above-described portable information terminal apparatus 20, and includes an input unit, a display unit, a control unit, a storage unit, and a communication unit, which are interconnected for mutual communications. However, the personal computer 30 is configured to be equal to or greater in size than the portable information terminal apparatus 20.

Figure 3:
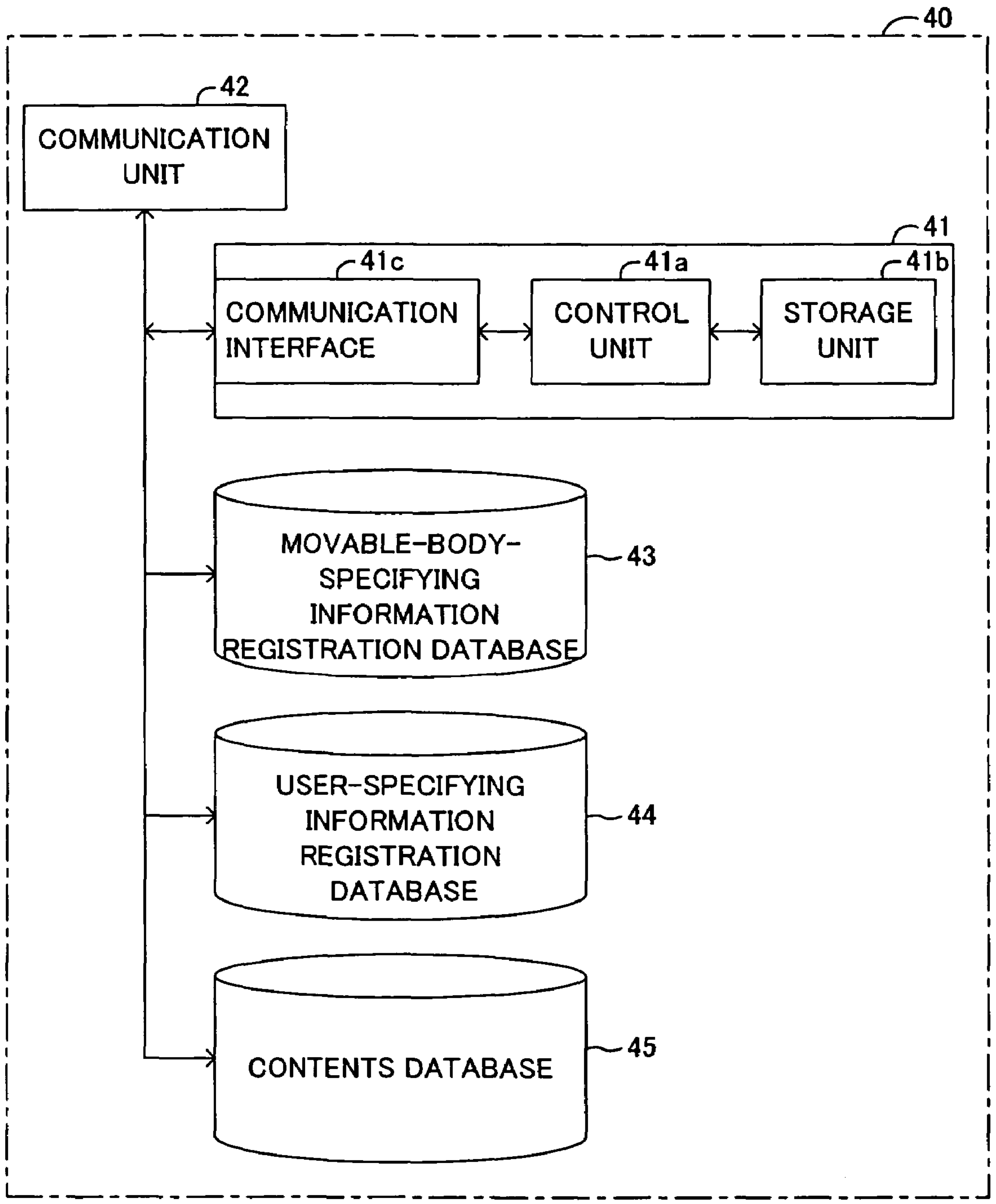
FIG. 3 is a schematic block diagram of an information proving center of FIG. 1.
Figure 4:
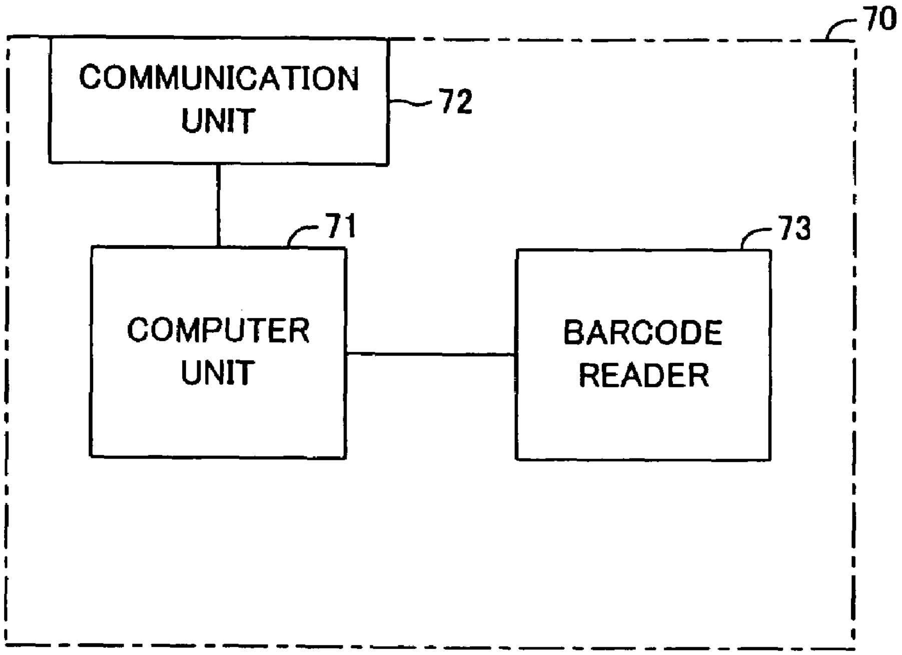
FIG. 4 is a schematic block diagram of a computer unit disposed at a vehicle assembly plant of FIG. 1.
Figure 5:
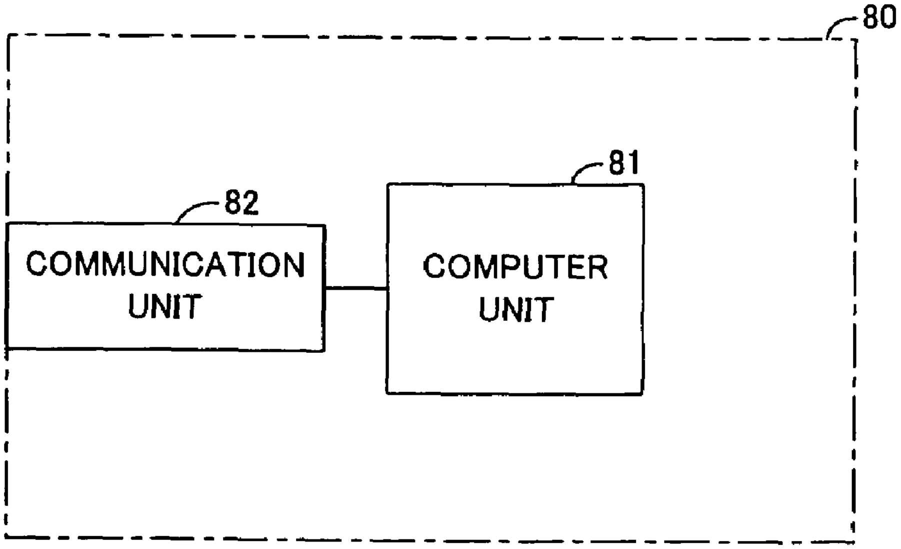
FIG. 5 is a schematic block diagram of a computer unit disposed at a vehicle sales shop of FIG. 1.

As shown in FIG. 3, the information providing center 40 comprises an information management server 41 and a communication unit 42, which are interconnected for mutual communications. The information management server 41 includes a control unit 41*a*, a storage unit 41*b*, and a communication interface 41*c*. The control unit 41*a* includes a CPU, ROM, and RAM, and controls the operation of the information management server 41. The storage unit 41*b* includes a recording medium such as a hard disk, and a drive unit for the recording medium. The storage unit 41*b* stores various programs and various kinds of data. The communication interface 41*c* is an interface for connection to a communication line (e.g., LAN line) installed in the information providing center 40. The communication unit 42 is wire-connected to the network 50 so as to enable wire communications with the personal computer 30, the vehicle assembly plant 70, and the vehicle sales shop 80 and wireless communication with the on-vehicle information terminal apparatus 10 and the portable information terminal apparatus 20 via the relay station 60.

The information providing center 40 has a movable-body-specifying information registration database 43, a user-specifying information registration database 44, and a contents database 45. These databases 43, 44, and 45 are connected to the communication line installed in the information providing center 40 so as to enable the information management server 41 to access the databases. The movable-body-specifying information registration database 43 stores, as registered data, movable-body-specifying information related to identification of each movable body; i.e., chassis number information representing a chassis number allotted to each vehicle during manufacture thereof, as well as MAC address information and phone number information imparted to the communication unit 15 of the on-vehicle information terminal apparatus 10. Notably, in the case where a movable body is the portable information terminal apparatus 20 or the personal computer 30, production number information of the apparatus 20 or 30 is registered instead of the chassis number information, and communication signal information used between the apparatus 20, 30 and the information providing center 40 is registered instead of the phone number information.

The user-specifying information registration database 44 stores, as registered data, user-specifying information for specifying a user, which information is provided when the user purchases a movable body; i.e., when the user purchases a vehicle. Examples of the information for specifying a user includes information representing the number plate of the vehicle provided by a predetermined organization (e.g., the Land Transport Bureau) when the user purchase the vehicle, and user ID information and user password information used for accessing the information providing center 40. Notably, in the case where the movable body is the portable information terminal apparatus 20 or the personal computer 30, the number plate information is replaced with, for example, information regarding a phone number or the like allotted to the communication unit.

The movable-body-specifying information and the user-specifying information are registered in the movable-body-specifying information registration database 43 and the user-specifying information registration database 44, respectively, in a mutually related manner. The contents database 45 stores previously entered contents data to be provided to users.

At the vehicle assembly plant 70, the on-vehicle information terminal apparatus 10 is assembled in each vehicle. From the vehicle assembly plant 70, information representing a chassis number allotted to the vehicle and information representing the MAC address and phone number of the communication unit 15 of the on-vehicle information terminal apparatus 10 are registered in the information providing center 40. Notably, when the on-vehicle information terminal apparatus 10 is assembled in the respective vehicle, the communication unit 15 of the on-vehicle information terminal apparatus 10 is firmly secured to the vehicle body so that the communication unit 15 cannot be easily detached from the vehicle.

In the vehicle assembly plant 70, a computer unit 71 serving as a first information registration apparatus, and a communication unit 72 are disposed. Like the personal computer 30, the computer unit 71 includes an input unit, a display unit, a control unit, and a storage unit, which are interconnected for mutual communications. The communication unit 72 is connected to the network 50, and transmits the chassis number information and information representing the MAC address and phone number of the communication unit 15 to the information providing center 40. A barcode reader 73 for decoding a barcode is connected to the computer unit 71. The barcode reader 73 decodes the chassis number information and the MAC address information of the communication unit 15, each represented by a barcode, and supplies the decoded information to the computer unit 71.

The vehicle sales shop 80 sells vehicles and registers in the information providing center 40 information representing a number plate of each vehicle. For such registration, a computer unit 81 serving as a second information registration apparatus, and a communication unit 82 are disposed at the vehicle sales shop 80. Like the personal computer 30, the computer unit 81 includes an input unit, a display unit, a control unit, and a storage unit, which are interconnected for mutual communications. The communication unit 82 is connected to the network 50, and transmits the number plate information to the information providing center 40.

In the information providing system constructed in the manner described above, communications among the on-vehicle information terminal apparatus 10, the portable information terminal apparatus 20, the personal computer 30, the information providing center 40, the vehicle assembly plant 70, and the vehicle sales shop 80 are performed wirelessly by use of the antennas 15*a* and 25*a* and the relay station 60 or are performed in a wired manner via the network 50. Either one of wireless communication and wire communication is carried out in an ordinary manner, with no characteristic feature. Therefore, in the following description, when a term "receiving," "sending," or the like is used, the receiving, sending, or the like should be considered to be performed in accordance with a suitable communication method.

Figure 6:
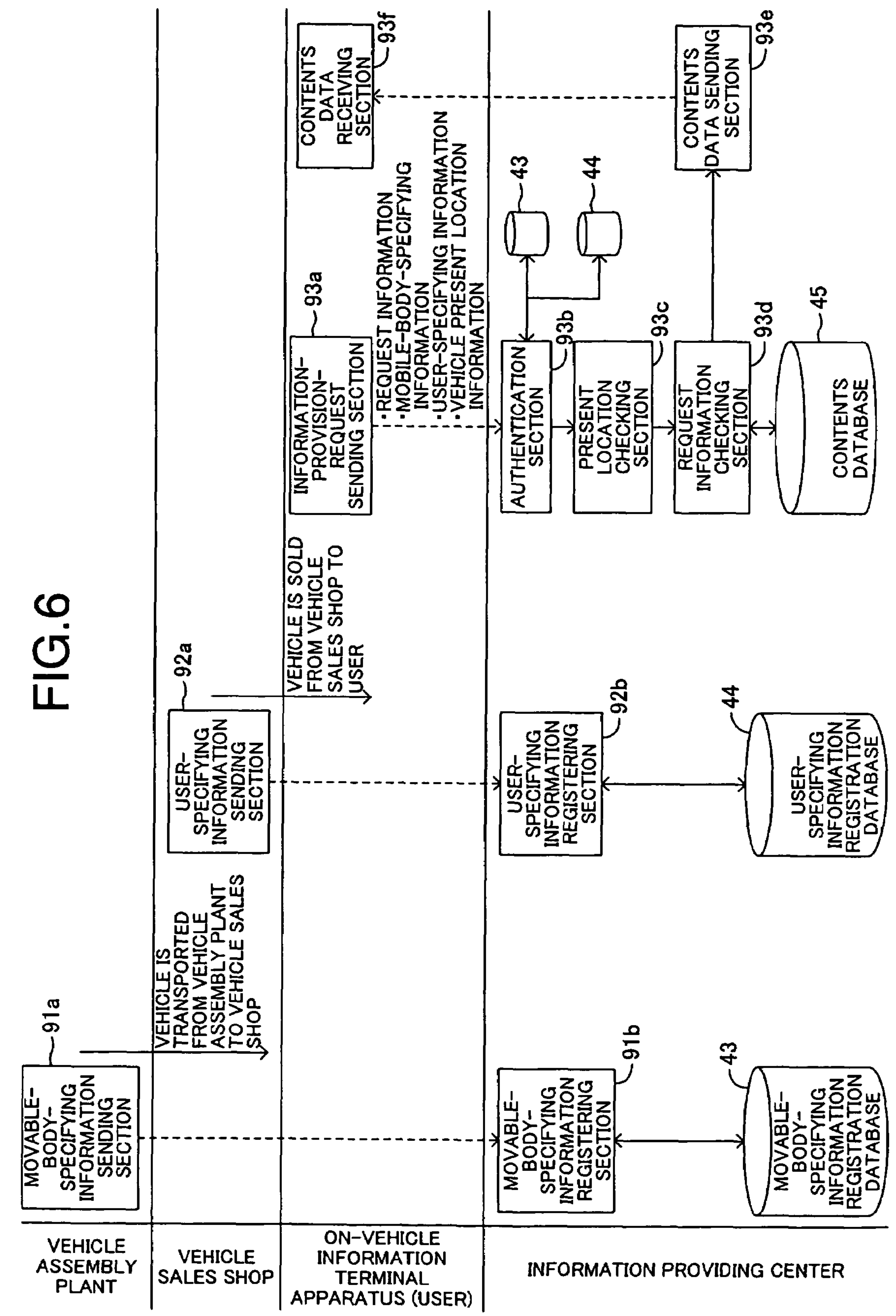
FIG. 6 is a functional block diagram showing operations which are performed by the on-vehicle information terminal apparatus, the information providing center, the vehicle assembly plant, and the vehicle sales shop so as to enable the on-vehicle information terminal apparatus to receive information from the information providing center.

Next, operation of the present embodiment having the above-described configuration will now be described in detail with reference to the functional block diagram shown in FIG. 6. Notably, the functional block diagram of FIG. 6 is depicted for an example case where the movable body is a vehicle. Therefore, in the following description, a vehicle is taken as an example of the movable body. Notably, even in the case where the movable body is the portable information terminal apparatus 20 or the personal computer 30, as in the case of the vehicle, information provided from the information providing center 40 can be received upon registration of movable-body-specifying information and user-specifying information in the information providing center 40.

First, there will be described operation for registering in the information providing center 40 movable-body-specifying information for specifying a vehicle. At the vehicle assembly plant 70, movable-body-specifying information of a vehicle in which the on-vehicle information terminal apparatus 10 is assembled is sent to the information providing center 40. Specifically, a worker in the vehicle assembly plant 70 reads chassis number information and MAC address information of the communication unit 15, the information being represented by barcodes, by use of an unillustrated read portion of the barcode reader 73. The barcode reader 73 obtains the barcodes read by means of the read portion, decodes the obtained barcodes, and temporarily stores the chassis number information and the MAC address information in unillustrated RAM. The worker connects the barcode reader 73 to the computer unit 71, and operates an unillustrated input unit of the computer unit 71 so as to transfer the chassis number information and the MAC address information temporarily stored in the unillustrated RAM of the barcode reader 73 to a predetermined area of the storage unit of the computer unit 71.

Next, the worker confirms the phone number allocated to the communication unit 15 and enters it in the computer unit 71, whereby the phone number information is stored in the predetermined area of the storage unit of the computer unit 71. Subsequently, the worker instructs the computer unit 71 to establish connection with the information providing center 40 and to send the stored chassis number information, MAC address information, and phone number information to the information providing center 40. In accordance with the instruction, the computer unit 71 accesses the information providing center 40 via the network 50 by use of the communication unit 72. Subsequently, the computer unit 71 sends the stored chassis number information, MAC address information, and phone number information to the information providing center 40. Further, by making use of the input unit 11 of the on-vehicle information terminal apparatus 10, the worker at the vehicle assembly plant 70 previously stores in the storage unit 14 the chassis number information, MAC address information, and phone number information sent to the information providing center 40. The functions of the computer unit 71, the communication unit 72, and the barcode reader 73 are described as a movable-body-specifying information sending section 91*a* in FIG. 6.

A movable-body-specifying information registering section 91*b* registers in the information providing center 40 the chassis number information, MAC address information, and phone number information sent from the computer unit 71. Specifically, the control unit 41*a* of the information management server 41 disposed at the information providing center 40 controls the communication unit 42 via the communication interface 41*c* to thereby obtain the various information pieces that have been sent. The control unit 41*a* temporarily stores the obtained information pieces in the storage unit 41*b*. Subsequently, the control unit 41*a* controls the movable-body-specifying information registration database 43 via the communication interface 41*c*, and stores and registers the obtained chassis number information, MAC address information, and phone number information in the movable-body-specifying information registration database 43.

Specifically, the control unit 41*a* creates a vehicle-specific holder in the movable-body-specifying information registration database 43 by making use of the obtained chassis number information. A chassis number is used as identification information; i.e., as a holder name of the created vehicle-specific holder. Subsequently, the control unit 41*a* stores the chassis number information, MAC address information, and phone number information in the created vehicle-specific holder. As described above, the movable-body-specifying information registering section 91*b* is realized by the control unit 41*a*, the storage unit 41*b*, the communication interface 41*c*, the communication unit 42, and the movable-body-specifying information registration database 43.

Next, there will be described user-specifying information registration operation which is performed when a user purchase a vehicle after the vehicle has been transported from the vehicle assembly plant 70 to the vehicle sales shop 80. When the user determines to purchase the vehicle, a vehicle registration number; i.e., a number plate, is issued to the vehicle by a predetermined organization (e.g., the Land Transport Bureau). When the user wishes to receive contents data from the information providing center 40, at the time of purchase of the vehicle, the user signs a contract with the information providing center 40 in relation to the provision of contents data. This contract is created by a salesperson at the vehicle sales shop 80 through operation of the computer unit 81 disposed at the vehicle sales shop 80.

That is, the salesperson instructs the computer unit 81 to access information providing center 40 and display a contract screen for inputting items necessary for the contract. According to the instruction, the computer unit 81 accesses the information providing center 40 through control of an unillustrated control unit and by making use of the communication unit 82, and requests the information providing center 40 to send contract screen information. In the information providing center 40, the control unit 41*a* of the information management server 41 receives the request via the communication unit 42, and sends the contract screen information previously stored in the storage unit 41*b*.

The computer unit 81 displays a contract screen on a display of the unillustrated display unit. In accordance with the displayed contract screen, the salesperson enters items necessary for the contract by use of the input unit. The necessary items to be input include the chassis number information provided on the vehicle body and the number plate information issued by the predetermined organization. Notably, the chassis number information is provided to the vehicle sales shop 80 when the vehicle is delivered from the vehicle assembly plant 70. Next, the salesperson instructs the computer unit 81 to send to the information providing center 40 the items entered on the contract screen. In accordance with the instruction, the computer unit 81 transmits the entered items to the information providing center 40. The function realized by the computer unit 81 and the communication unit 82 is described as a user-specifying information sending section 92*a* in FIG. 6.

A user-specifying information registering section 92*b* registers in the information providing center 40 the chassis number information and number plate information sent from the computer unit 81. Specifically, the control unit 41*a* of the information management server 41 disposed at the information providing center 40 controls the communication unit 42 via the communication interface 41*c* to thereby obtain the various information pieces that have been sent. The control unit 41*a* temporarily stores the obtained information pieces in the storage unit 41*b*. Subsequently, the control unit 41*a* controls the movable-body-specifying information registration database 43 via the communication interface 41*c*, and stores and registers the obtained number plate information in the user-specifying information registration database 44.

Specifically, the control unit 41*a* creates a vehicle-specific holder in the user-specifying information registration database 44. The stored chassis number is used as identification information; i.e., as a name of the created vehicle-specific holder. Subsequently, the control unit 41*a* stores the number plate information in the created vehicle-specific holder.

Further, the control unit 41*a* issues, to the user having signed the contract, user ID information and user password information necessary for accessing the information providing center 40, and stores and registers the issued ID information and user password information in the created vehicle-specific holder. The number plate information, user ID information, and user password information stored in this manner are registered as user-specifying information for specifying a user. Subsequently, the issued user ID and user password are sent to the computer unit 81 of the vehicle sales shop 80, and the salesperson provides the sent information to the user. As described above, the user-specifying information registering section 92*b* is realized by the control unit 41*a*, the storage unit 41*b*, the communication interface 41*c*, the communication unit 42, and the user-specifying information registration database 44.

Next, there will be described operation which enables the on-vehicle information terminal apparatus 10 of the vehicle purchased by the user to communicate with the information providing center 40 and receive contents data therefrom. When the vehicle is to be delivered to the user, the salesperson at the vehicle sales shop 80 previously stores the number plate information of the vehicle in the storage unit 14 by making use of the input unit 11 of the on-vehicle information terminal apparatus 10. The user requests the information providing center 40 to send contents data, by making use of the input unit 11 of the on-vehicle information terminal apparatus 10. Specifically, by use of the input unit 11, the user enters the URL (Uniform Resource Locator) of the information providing center 40, the user ID information and user password information issued by the information providing center 40, and request information indicating request of transmission of the contents data.

The input information pieces are supplied to the control unit 13, which controls the communication unit 15 to thereby send them to the information providing center 40. With this operation, the control unit 13 of the on-vehicle information terminal apparatus 10 can establish a connection with the information providing center 40. Subsequently, the control unit 13 sends the request information to the information providing center 40.

At this time, along with the user ID information, user password information, and request information entered by the user, the movable-body-specifying information (i.e., chassis number information, MAC address information, and phone number information), which has been previously stored in the storage unit 14 by the worker at the vehicle assembly plant 70, is automatically sent to the information providing center 40. Moreover, the number plate information, which has been previously stored in the storage unit 14 by the salesperson at the vehicle sales shop 80 and which serves as user-specifying information, is automatically sent to the information providing center 40. Since the number plate information is automatically sent to the information providing center 40, in the information providing center 40, the number plate information is recognized as user-specifying information along with the user ID information and the user password information. Furthermore, vehicle present location information representing the present location of the vehicle detected by means of the navigation unit 16 is automatically transmitted to the information providing center 40. As described above, the function realized by the input unit 11, the display unit 12, the control unit 13, the storage unit 14, the communication unit 15, and the navigation unit 16 is described as an information-provision request sending section 93*a*.

An authentication section 93*b* authenticates the movable-body-specifying information and user-specifying information sent from the on-vehicle information terminal apparatus 10. Specifically, the movable-body-specifying information and user-specifying information received by means of the communication unit 42 are supplied from the communication unit 42 to the control unit 41*a* of the information management server 41. The control unit 41*a* temporarily stores the supplied information pieces in unillustrated RAM. Further, the control unit 41*a* uses the movable-body-specifying information registration database 43 and the user-specifying information registration database 44 via the communication interface 41*c*, and collates the information pieces temporarily stored in the RAM with data in the databases. As described above, the authentication section 93*b* is a function realized by means of the control unit 41*a*, the communication interface 41*c*, the movable-body-specifying information registration database 43, and the user-specifying information registration database 44.

A present location checking section 93*c* checks whether the present location of the vehicle coincides with a predetermined location, on the basis of the vehicle present location information sent from the on-vehicle information terminal apparatus 10. Specifically, the vehicle present location information received by means of the communication unit 42 is supplied from the communication unit 42 to the control unit 41*a* of the information management server 41. The control unit 41*a* temporarily stores the supplied vehicle present location information in the unillustrated RAM. Subsequently, the control unit 41*a* compares the present location of the vehicle with the predetermined location stored in the storage unit 41*b*, and checks whether the present location of the vehicle coincides with the predetermined location. The predetermined location is a position (e.g., garage at home, parking lot of an office) which has been designated by the user in advance and sent to the information providing center 40, and is maintained secret for people other than the user. Notably, when the present location of the vehicle does not coincide with the predetermined location, the control unit 41*a* does not provide any information. As described above, the present location checking section 93*c* is a function realized by means of the control unit 41*a* and the storage unit 41*b*.

A request information checking section 93*d* checks the contents requested by the user, on the basis of the request information sent from the on-vehicle information terminal apparatus 10. That is, the request information received by means of the communication unit 42 is supplied from the communication unit 42 to the control unit 41*a* of the information management server 41. The control unit 41*a* temporarily stores the supplied request information in the unillustrated RAM. Further, the control unit 41*a* searches the contents database 45 via the communication interface 41*c*, and obtains contents data which matches with the request information temporarily stored in the RAM. The control unit 41*a* temporarily stores the obtained contents data in the unillustrated RAM. As described above, the request information checking section 93*d* is a function realized by means of the control unit 41*a*, the communication interface 41*c*, the communication unit 42, and the contents database 45.

A contents data sending section 93*e* sends to the on-vehicle information terminal apparatus 10 the contents data obtained by means of the request information checking section 93*d*. That is, the control unit 41*a* controls the communication unit 42 via the communication interface 41*c*, and transmits to the on-vehicle information terminal apparatus 10 the contents data temporarily stored in the unillustrated RAM. As described above, the contents data sending section 93*e* is a function realized by means of the control unit 41*a*, the communication interface 41*c*, and the communication unit 42.

A contents data receiving section 93*f* receives the contents data sent from the information providing center 40. Specifically, when the on-vehicle information terminal apparatus 10 receives the contents data sent from the contents data sending section 93*e* via the communication unit 15, the received contents data are supplied to the control unit 13. The control unit 13 stores the supplied contents data in the storage unit 14, and controls the display unit 12 so as to display the stored contents on an unillustrated liquid crystal display. At this time, the control unit 13 executes a browser program previously stored in the storage unit 14, to thereby display the received contents data on the browser. As described above, the contents data receiving section 93*f* is a function realized by means of the display unit 12, the control unit 13, the storage unit 14, and the communication unit 15.

As can be understood from the above description, according to the present embodiment, at the time of shipment of a vehicle from a plant, movable-body-specifying information composed of chassis number information, MAC address information, and phone number, is sent from the computer unit 71; and the information providing center 40 registers the sent movable-body-specifying information in the movable-body-specifying information registration database 43. Further, at the time of sales of the vehicle, chassis number information and number plate information are sent from the computer unit 81; and the information providing center 40 registers the sent number plate information in the user-specifying information registration database 44. The information providing center 40 supplies user ID information and user password information to a user, and registers, in the user-specifying information registration database 44, the supplied information pieces and the number plate information as user-specifying information. At the time of these registrations, the information providing center 40 creates a vehicle-specific holder, with the chassis number information being used as a holder name, in each of the movable-body-specifying information registration database 43 and the user-specifying information registration database 44, and then stores and registers the movable-body-specifying information and the user-specifying information. Therefore, the movable-body-specifying information and the user-specifying information can be registered, while being related (linked) with each other by the chassis number information.

Since the movable-body-specifying information and the user-specifying information are registered by means of the computer unit 71 disposed at the vehicle assembly plant 70 and the computer unit 81 disposed at the vehicle sales shop 80, the user is not required to perform the registration procedure, and can considerably easily register necessary information in the information providing center 40. Further, even when the user trades in the vehicle for a new vehicle, through practice of the present embodiment, the user can register movable-body-specifying information of the new vehicle and can easily receive information, without performing any special operation.

The movable-body-specifying information, the user-specifying information, and the present location of the vehicle are checked; and when the vehicle is not present at a predetermined location, information is not provided. Therefore, even in the case where a person other than the user obtains the movable-body-specifying information and the user-specifying information of the user by use of the on-vehicle information terminal apparatus 10 installed in another vehicle, and requests provision of information while pretending to be the user, if the vehicle is not located at the predetermined location kept secret, the person cannot receive the information. By virtue of this, only a user who properly signs a contract with the information providing center 40 can receive the information, and therefore, the copyright in relation to the information to be provided can be properly protected.

Notably, in the case where the movable body is the portable information terminal apparatus 20 or the personal computer 30, for example, a user's own house or office is designated as the predetermined location. In this case, the user operates the portable information terminal apparatus 20 or the personal computer 30 and sends information representing, for example, the address of the house or office to the information providing center 40. At this time, information representing the sending position is also sent from the communication unit of the portable information terminal apparatus 20 or the personal computer 30. The information providing center 40 receives the information representing the address of the house or office and the sending point information from the portable information terminal apparatus 20 or the personal computer 30. On the basis of the received information pieces, the present location checking section 93*c* checks whether the access is performed from the predetermined location. In this case as well, when the access is not performed from the predetermined location, the information cannot be received, whereby the copyright regarding the information to be provided can be properly protected.

The invention claimed is:

1. An information providing method for allowing communication between a vehicle and a fixed station in which a first information registration apparatus is placed in the vehicle at a plant where the vehicle is manufactured, a second information registration apparatus is placed in the vehicle at a sales shop where the vehicle is sold, a movable-body identification information is issued at the time the vehicle is sold, a communication unit identification information is issued at the time a communication unit is manufactured, and a user identification information is issued to a user who owns the vehicle, the information providing method comprising:

sending the movable-body identification information, capable of uniquely identifying the vehicle, from the first information registration apparatus to the fixed station;

sending the communication unit identification information, capable of uniquely identifying the communication unit, from the first information registration apparatus to the fixed station;

sending, in a mutually related manner, the user identification information, capable of identifying a user who owns the vehicle, and the movable-body identification information, from the second information registration apparatus to the fixed station;

creating a vehicle-specific holder in the fixed station, by using the movable-body identification information sent from the first information registration apparatus;

registering in the vehicle-specific holder the movable-body identification information and the communication unit identification information sent from the first information registration apparatus and the vehicle-specific holder the user identification information sent from the second information registration apparatus in a mutually related manner;

authenticating the vehicle through the fixed station whenever a request for information, containing an identification information, is sent from the vehicle by comparing the identification information sent from the vehicle with the corresponding identification information registered in the vehicle-specific holder, wherein the identification information consists of at least one of the movable-body identification information, the communication unit identification information, and the user identification information; and providing a predetermined piece of information to the vehicle on the basis of the request information when the vehicle is authenticated.

2. An information providing method according to claim 1, wherein the communication unit is integrally assembled in the vehicle.

3. An information providing method according to claim 1, wherein at least one of the movable-body identification information and the communication unit identification information is represented by a barcode.

4. An information providing method according to claim 1, wherein the movable-body identification information is chassis number information representing a unique chassis number which is issued at the time of manufacture of the vehicle, and the communication unit identification information is composed of unique identification information which is issued by a predetermined organization at the time of manufacture of the communication unit and information representing a phone number previously allotted to the communication unit.

5. An information providing method according to claim 1, wherein the user identification information is composed of vehicle registration number information representing a vehicle registration number which is issued by a predetermined organization at the time the vehicle is sold, and user ID information and user password information issued from the fixed station and used for accessing the fixed station.

6. An information providing system in which a vehicle and a fixed station communicate with each other and the fixed station provides various types of information to the vehicle, the system being characterized as comprising:

a first information registration apparatus disposed in the vehicle at a plant at which the vehicle is manufactured and being capable of communicating with the fixed station and a second information registration apparatus disposed in the vehicle at a sales shop at which the vehicle is sold and being capable of communicating with the fixed station, wherein the first information registration apparatus comprises:

input means for inputting movable-body identification information for identifying the vehicle issued at the time of manufacture of the vehicle and communication unit identification information for identifying a communication unit issued at the time of manufacture of the communication unit assembled in the vehicle and used for communication with the fixed station, and sending means for sending to the fixed station the movable-body identification information and the communication unit identification information input by the input means;

the second information registration apparatus comprises:

input means for inputting user identification information for identifying a user of the vehicle and the movable-body identification information; and sending means for sending to the fixed station the user identification information and the movable-body identification information input by the input means; the vehicle comprises:

input means for inputting request information for requesting the fixed station to provide various types of information, and sending means for sending to the fixed station the request information input by the input means, and at least one of the movable-body identification information, the communication unit identification information, and the user identification information; and the fixed station comprises:

first receiving means for receiving the movable-body identification information and the communication unit identification information sent from the first information registration apparatus and for receiving the user identification information and the movable-body identification information sent from the second information registration apparatus, registering means for registering, in a mutually related manner, the movable-body identification information, the communication unit identification information, and the user identification information received by the first receiving means, wherein the registering means creates a vehicle-specific holder by making use of the movable-body identification information received by the first receiving means and registers, in a mutually related manner, the movable-body identification information, the communication unit identification information, and the user identification information in the vehicle-specific holder, storage means for storing the movable-body identification information, the communication unit identification information, and the user identification information registered by the registering means in a mutually related manner in the created vehicle-specific holder, second receiving means for receiving request information representing request for information provision and at least one of the movable-body identification information, communication the communication unit identification information, and the user identification information sent from the vehicle, authentication means for authenticating the vehicle by comparing at least one of the movable-body identification information, the communication unit identification information, and the user identification information, received by the second receiving means, with the movable-body identification information, the communication unit identification information, and the user identification information stored by the storage means in a mutually related manner in the created vehicle-specific holder, and sending means for sending a predetermined piece of information to the vehicle on the basis of the request information received by the second receiving means, when the vehicle is specified by the authentication means.

7. An information providing system according to claim 6, wherein the communication unit is integrally assembled in the vehicle.

8. An information providing system according to claim 6, wherein at least one of the movable-body identification information and the communication unit identification information is represented by a barcode.

9. An information providing system according to claim 6, wherein the movable-body identification information is chassis number information representing a unique chassis number which is issued at the time of manufacture of the vehicle, and the communication unit identification information is composed of unique identification information which is issued by a predetermined organization at the time of manufacture of the communication unit and information representing a phone number previously allotted to the communication unit.

10. An information providing system according to claim 6, wherein the user identification information is composed of vehicle registration number information representing a vehicle registration number which is issued by a predetermined organization at the time of sales of the vehicle, and user ID information and user password information which are issued from the fixed station and used for accessing the fixed station.

11. A fixed station which provides various types of information to a vehicle, the fixed station comprising:

first receiving means for receiving, from a first information registration apparatus disposed in the vehicle at a plant at which the vehicle is manufactured, movable-body identification information for identifying the vehicle issued at the time of manufacture of the vehicle and communication unit identification information for identifying a communication unit issued at the time of manufacture of the communication unit assembled in the vehicle and from a second information registration apparatus disposed in the vehicle at a sales shop at which the vehicle is sold, user identification information for identifying a user of the vehicle and the movable-body identification information;

movable-body-specifying information registering means for registering, in a mutually related manner, the movable-body identification information and the communication unit identification information from the first information registration apparatus received by the first receiving means, wherein the movable-body-specifying information registering means creates a vehicle-specific holder by making use of the movable-body identification information from the first information registration apparatus received by the first receiving means and registers, in a mutually related manner, the movable-body identification information and the communication unit identification information in the vehicle-specific holder;

movable-body-specifying information registration database for accumulating and storing the information pieces registered by the movable-body-specifying information registering means;

user-specifying information registering means for registering, in a mutually related manner, the user identification information and the movable-body identification information from the second information registration apparatus received by the first receiving means, wherein the user-specifying information registering means creates a vehicle-specific holder by the movable-body identification information from the second information registration apparatus received by the first receiving means and registers, in a mutually related manner, the user identification information and the movable-body identification information in the vehicle-specific holder;

user-specifying information registration database for accumulating and storing the information pieces in the vehicle-specific holder registered by the user-specifying information registering means;

contents data base for storing contents information to be provided to the user;

second receiving means for receiving request information representing request for the contents information and at least one of movable-body identification information, communication unit identification information, and user identification information sent from the vehicle, authentication means for authenticating the vehicle by comparing at least one of the movable-body identification information, the communication unit identification information, and the user identification information, received by the second receiving means, with the movable-body identification information and the communication unit identification information in the vehicle-specific holder stored in the movable-body-specifying information registration database, and the user identification information and the movable-body identification information in the vehicle-specific holder registered in the user-specifying information registration database; and sending means for sending the contents information stored in the contents database, when the vehicle is specified by the authentication means.

12. A fixed station according to claim 11, wherein the communication unit is integrally assembled in the vehicle.

13. A fixed station according to claim 11, wherein at least one of the movable-body identification information and the communication unit identification information is represented by a barcode.

14. A fixed station according to claim 11, wherein the movable-body identification information is chassis number information representing a unique chassis number which is issued at the time of manufacture of the vehicle, and the communication unit identification information is composed of unique identification information which is issued by a predetermined organization at the time of manufacture of the communication unit and information representing a phone number previously allotted to the communication unit.

15. A fixed station according to claim 11, wherein the user identification information is composed of vehicle registration number information representing a vehicle registration number which is issued by a predetermined organization at the time of sales of the vehicle, and user ID information and user password information which are issued from the fixed station and used for accessing the fixed station.

* * * * *